Oct. 6, 1964 J. J. ORR ETAL 3,151,720
SILAGE DISTRIBUTOR
Filed Feb. 27, 1963 2 Sheets-Sheet 1
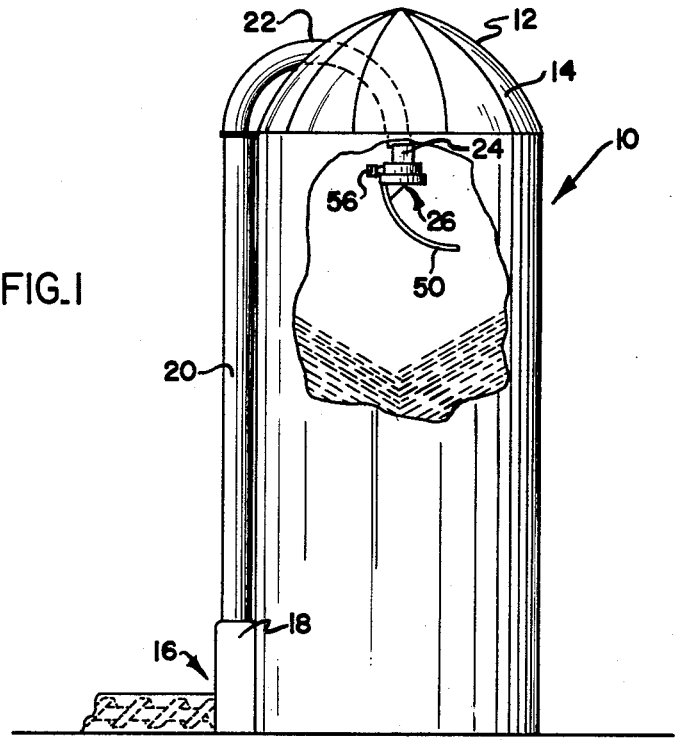
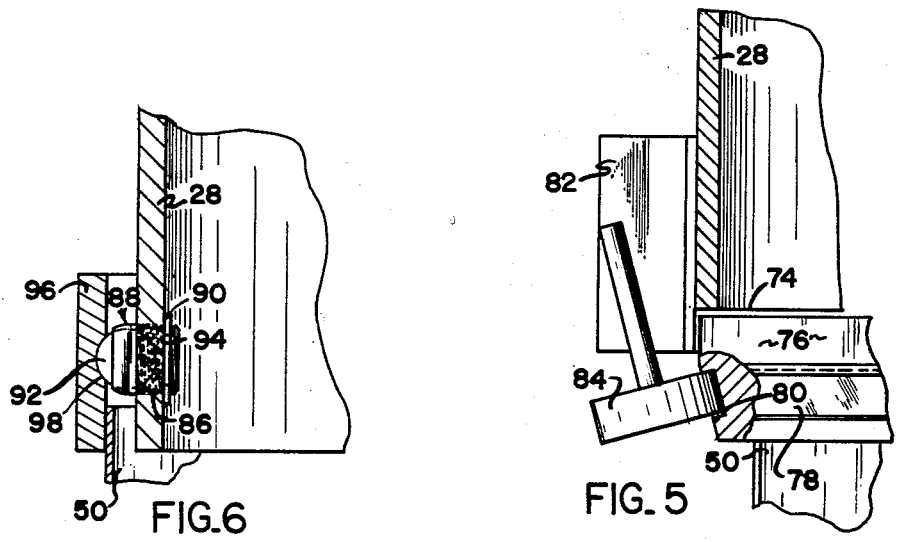
INVENTORS
JEFFREY J. ORR
JOHN J. SHANKLAND
BY
Oberlin, Maky & Donnelly
ATTORNEYS Oct. 6, 1964   J. J. ORR ETAL   3,151,720
SILAGE DISTRIBUTOR
Filed Feb. 27, 1963   2 Sheets-Sheet 2
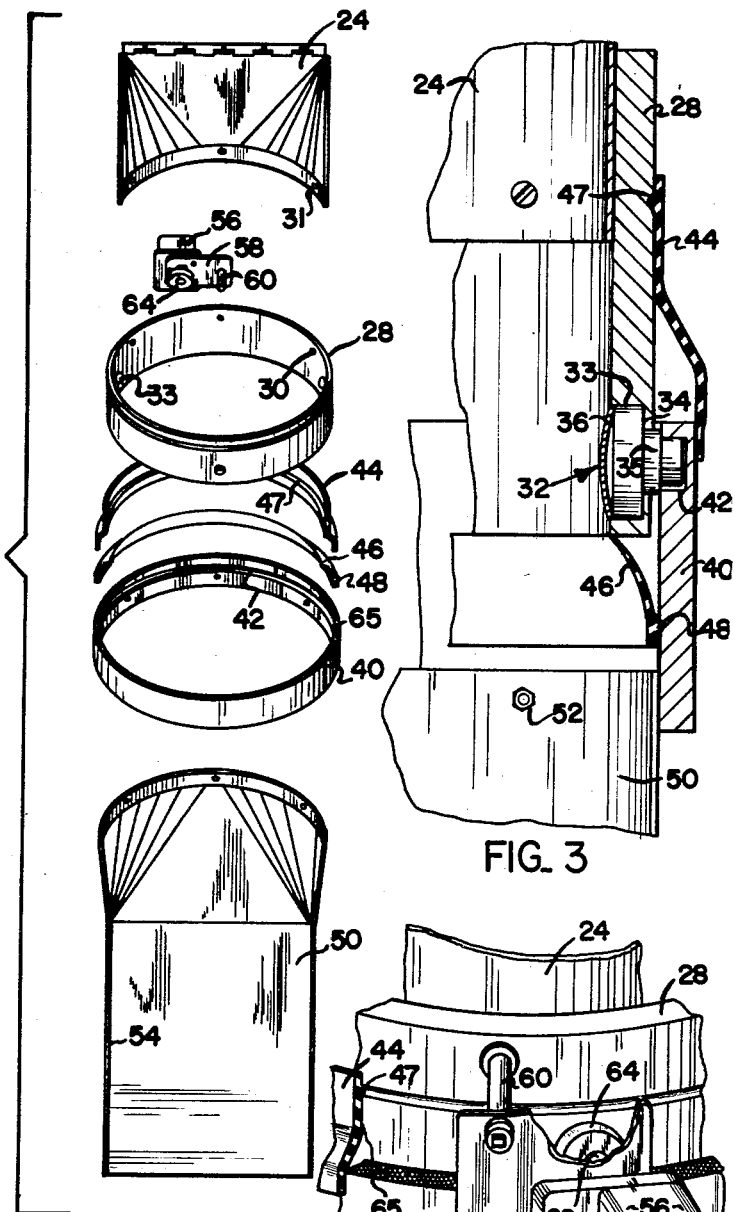
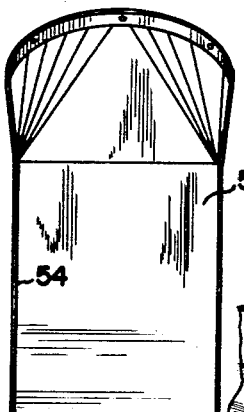
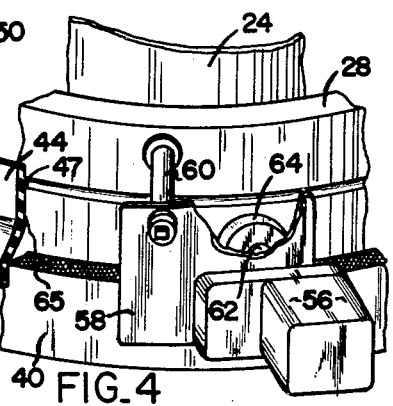
INVENTORS
JEFFREY J. ORR
JOHN J. SHANKLAND
BY
Oberlin, Maky & Donnelly
ATTORNEYS United States Patent Office 3,151,720
Patented Oct. 6, 1964

3,151,720
SILAGE DISTRIBUTOR
Jeffrey J. Orr, Doylestown, Ohio, and John J. Shankland,
R.D. 1, Doylestown, Ohio; said Orr assignor to said
Shankland
Filed Feb. 27, 1963, Ser. No. 261,395
6 Claims. (Cl. 193—3)

This invention relates as indicated to a silage distributor and more particularly to a new and improved distributor for distributing silage as it is conveyed to the silo.

In filling silos it is well known that unless means are employed to control distribution of the silage, the heavier portions thereof will tend to pile up in the center of the silo, while the lighter portions will tend to gravitate toward the side of the silo. This uneven, cone-shape buildup of silage is undesirable for many reasons. Initially, such uneven buildup materially reduces the silo capacity due to the creation of air pockets and relatively poor packing adjacent the silo wall, the area of greatest capacity in the silo, the air pockets being further undesirable in that they promote spoilage. Secondly, where the heavier portions are allowed to build up in the center, drainage is toward the wall of the silo, thereby adversely affecting the subsequent removal of the silage from the silo, as well as increasing maintenance costs and decreasing silo life.

Various means have been employed in the past for evenly distributing the silage as it deposits in the silo. One such type is the so-called "self-propelled" type wherein the force of the silage gravitating downwardly through the distributor operates a rotor for imparting rotary movement to the distributor. This type of distributor is generally disadvantageous due to the intermittent flow of the silage thereinto, which accordingly adversely affects the uniformity of distribution.

Thus, in order to more uniformly distribute the incoming silage, distributors have been developed that are positively rotated by an electric motor operatively connected thereto. These have for the most part been relatively complex in structure and hence very cumbersome to handle as well as being relatively costly.

With the above in mind, it is a primary object of the invention to continuously uniformly distribute silage flowing into the silo through the provision of a new and improved motor driven silage distributor.

Another object of the invention is to provide such a new and improved silo distributor which is extremely compact and light weight, thus significantly enhancing the handling thereof in addition to substantially decreasing the manufacturing cost thereof.

Yet another object of the present invention is to provide a distributor wherein the silage deflecting portion thereof is rotated at a constant speed independent of the rate of flow of silage therethrough.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is an elevational view, partially broken, of a silo and a silage conveying and distributing system therefor, the latter embodying the preferred form of the silage distributor forming the present invention;

FIG. 2 is an exploded view of the preferred form of silage distributor assembly of the invention;

FIG. 3 is a cross-sectional view showing the bearing support structure for the silage deflecting member of the preferred form;

FIG. 4 is a fragmentary, perspective view of the preferred form of silage distributor, showing more particularly the drive means therefor;

FIG. 5 is a vertical cross-sectional view of a modified form of the invention having a modified bearing support structure; and FIG. 6 is a vertical cross-sectional view of another modified form of the bearing support.

Referring now to the drawings, wherein like parts are designated by like reference characters, there is generally indicated at 10 a silo of conventional construction provided with a top 12 comprising a series of connected, segmented sections 14 which together form a hemispherical enclosure for the silo proper. At least one of the segmented portions 14 is mounted for movement in known fashion to a position uncovering a portion of the top of the silo. Such movement is generally accommodated through a sliding arrangement enabling the segment movably mounted to be slid beneath the adjoining segment.

When the silo 10 is desired to be filled with silage, the slidable segment is moved to allow entry into the top portion 12 whereupon a blower unit generally indicated at 16 can be disposed in position to forcibly lift silage from ground level to the silo interior. The blower unit 16 comprises a blower 18 which receives silage from a suitable feed means, e.g., an auger conveyor, and blows the same upwardly through an elongated, generally multisectioned, blower tube 20 through a goose neck portion 22 disposed through the opening in the top 12, the inner end of such goose neck portion being connected to a top mounting member 24 which forms part of a silage distributor generally indicated at 26, the member 24 and distributor 26 being approximately axially centered in the silo 10. The goose neck portion 22 is open at the bottom, the silage fed thereto clinging to the upper curved portion thereof by centrifugal force. The blower unit 16 is preferably operated through a power take-off from a tractor, e.g., and forms no part of the instant invention and has been described only in order to provide a more satisfactory understanding of the present invention.

The upper mounting member 24 is provided with means for adjustably connecting the same to the bottom of the goose neck 22 for accommodating goose necks which are slightly inclined relative to the vertical. Such adjustment enables the mounting member 24 and the distributor 26 to be maintained substantially vertical and approximately axially centered relative to the silo 10 whereby silage conveyed therethrough is distributed by the distributor 26 in the manner indicated in FIG. 1. The continuous rotation of the distributor 26, by means to be hereinafter described, causes the silage to be deflected by the distributor 26 to the area relatively adjacent the wall of the silo thereby effecting a buildup of silage as shown in FIG. 1. The distributor 26 is aligned with the goose neck 22 when mounted thereon so that the silage is directed to approximately the same area on the deflector plate regardless of the rotative position of the latter whereby the silage is more uniformly distributed. The silage distributor is preferably connected to the terminal portion 24 prior to the raising of the latter, along with the blower tube 20, to the vertical, FIG. 1, operative condition. It will accordingly be seen that the weight of the silage distributor 26 is a very significant factor in the use thereof.

Referring now to the specific construction of the preferred form of silage distributor 26, and particularly to FIGS. 2–4, a stationary cylinder or sleeve 28 is provided for attaching the distributor 26 to the upper mounting member 24, there being circumferentially spaced openings 30 provided in the cylinder 28 for such purpose. Openings 30 are aligned with openings 31 in the member 24 when the latter is telescoped within the cylinder 28, the connection being effected by simple nut and bolt connections, whereby the distributor 26 is readily connectible to and disconnectible therefrom. The upper part of member 24 is adjustably connected to the goose neck by any suitable means, as previously mentioned.

A plurality of circumferentially spaced bearing assemblies 32 are mounted on the stationary cylinder 28 and extend through openings 33 provided therein, as clearly shown in FIG. 3. The bearings 32 are preferably press-fitted on the cylinder 28 from the inside, the bearings being radially limited by means of the reduced diameter portions 34 of the cylinder openings through which the bearings extend. The bearings 32 include shaft-like preferably nylon portions 35 which extend exteriorly of the cylinder 28 and are journalled in the bearing assemblies for relatively friction free rotation. End caps 36 are used to retain the bearing assemblies in the openings 33, the caps 36 serving also to prevent the entry of dust and foreign matter thereinto.

Rotatably supported on the circumferentially spaced shaft portions 35 of bearings 32 is a rotatable or driven cylinder generally indicated at 40 having an annular groove 42 formed therein for receiving the shaft portions 35. When the driven cylinder 40 is rotated by means to be described hereinbelow, it will be supported by the bearing assemblies thereby effecting relatively friction free rotation thereof.

Top and bottom annular, resilient sealing members 44 and 46, respectively are provided to seal the bearing assemblies 32 from dust and other foreign matter during operation of the unit. The top seal 44 is provided with an annular rib 47 which is adapted to snap in a complementary groove formed in the stationary cylinder 28 when the seal 44 is slipped thereover and moved downwardly. The bottom seal 46 is similarly provided with an annular rib 48 which is adapted to snap into sealing engagement with an annular groove formed in the rotating cylinder 40. The resilient sealing members 44 and 46 are resiliently flexible and the lower ends thereof contact the cylinders 40 and 28, respectively thereby sealing the bearing assemblies 32.

A curved deflector plate 50 is mounted on the cylinder 40 by means of mounting screws 52, the deflector plate 50 being also axially curved, as can be seen in FIG. 1, for deflecting the silage delivered to the distributor to the silo walls as previously explained. The plate 50 is provided with side flanges 54 for retaining the silage in guided travel on the curved plate.

Referring now to the means for rotating the cylinder 40 and the deflector 50 carried thereby, an electric motor 56 is mounted on a mounting bracket 58 by means of mounting bolts (not shown), the bracket being pivotally connected to the stationary ring 28 by bolt 60 which extends through cylinder 28 and is retained thereon by nut means (not shown). The shaft 62 from the motor 56 has mounted thereon a preferably rubber drive wheel 64 which is adapted to contact the top, preferably knurled surface 65 of the rotating cylinder 40 thereby driving the same and thus the deflector plate 50. It should be noted that the engagement between the wheel 64 and the surface 65 is axially lower than the axis of the bolt 60 about which the bracket 58 pivots whereby the weight of the bracket and motor serve to maintain the drive wheel in engagement with the surface 65. Spring means could obviously also be employed for similarly maintaining the drive wheel in operative engagement with the surface 65. The seal 44 is seated on the cylinder 28 below the bolt 60 so as to not interfere therewith, and a suitable opening is provided in the seal 44 for accommodating the motor shaft 62.

Referring now to an alternative form shown in FIG. 5, an annular rotating ring member 74 is employed in lieu of the rotating cylinder 40 employed in the preferred form of the invention. The ring member 74, which carries the deflector plate 50 at the bottom thereof, is provided with a substantially flat cylindrical portion 76 and a downwardly beveled bottom portion 78, the latter being provided with an inwardly offset inclined annular groove 80. The stationary cylinder 28 in the FIG. 5 form has circumferentially mounted thereon a series of roller support members 82 which rotatably support rollers 84, said rollers being disposed in the grooves 80 as shown in FIG. 5. In the FIG. 5 form the rubber drive wheel 64 engages the cylindrical portion 76 of the ring 74 whereby the latter is rotated relative to the cylinder 28. The motor mounting structure and the drive connection for the FIG. 5 form is the same as for the preferred form described above with the exception that the drive wheel 64 is mounted on a vertical axis.

FIG. 6 shows another form for rotatably supporting the deflector plate relative to the fixed cylinder 28. In this form the cylinder 28 is formed with a plurality of circumferentially spaced, tapped openings 86 for receiving externally threaded bearing members 88, lock nuts 90 being provided to maintain the members 88 in their radially adjusted position relative to the cylinder 28. The bearing members 88 comprise a relatively large ball member 92 which is rotatably supported by a plurality of relatively small balls 94. The bearing casing is inwardly tapered adjacent the outer end to retain the ball members in place.

The ball 92 rides in an annular groove 98 formed in a deflector plate-supporting cylinder or ring member 96 which is adapted to be directly driven by the drive wheel 64. It will accordingly be seen that rotation of the cylinder 96 will be effected in a relatively friction free manner. The deflector plate 50 is mounted on the ring 96 below the groove 98 so as not to interfere with the bearing members 88. The ring 96 is rotated in the same manner as above described in reference to the FIG. 5 form.

The operation of the silage distributor embodied in all forms of the invention should now be apparent from the above description. As silage is forced upwardly by the blower 18 it is guided by the goose neck 22 downwardly through the stationary cylinder 28 into contact with the rotating deflector plate 50 which is carried by the driven cylinder 40. The continual rotation of the deflector plate 50 through the motor 56 continuously effects the deflecting of the silage toward the wall of the silo whereby such silage is uniformly packed in the manner illustrated in FIG. 1. Such uniform distribution provides a maximum packing of the silage in the area adjacent the wall, a very desirable condition, as noted above.

The novel silage distributor forming the present invention is highly simplified in construction and composed of but few parts. Further, it is readily connectible to and disconnectible from the goose neck 22. Moreover, the motor 56 is mounted on the distributor in such a way as to enable the same to be readily removed therefrom for needed repairs, etc. The entire distributor assembly is extremely light, especially in comparison with previous silage distributors of this general type, thus enabling manufacturing thereof at much reduced cost in comparison with previous distributors, as well as greatly facilitating handling thereof, having particularly in mind the raising thereof into operative position as above described.

Other modes of applying the principle of the invention may be employed, change being made as regards the details described, provided the features stated in any of the following claims or the equivalent of such be employed.

We therefore particularly point out and distinctly claim as our invention:

1. Apparatus for continuously uniformly distributing silage or the like comprising a stationary cylinder, a plurality of circumferentially spaced bearing members mounted on said cylinder and extending outwardly from the periphery thereof, a rotatable cylinder concentric with and spaced outwardly from said stationary cylinder, said rotatable cylinder being formed with an annular groove for receiving said bearing members whereby said rotatable cylinder is rotatably supported thereby, said rotatable cylinder having a top, knurled drive surface by means of which said rotatable cylinder can be frictionally driven, silage deflector means mounted on said rotatable cylinder means and extending downwardly therefrom, motor means pivotally mounted on said stationary cylinder, and a rotatable friction drive wheel driven by said motor means and engaging said top knurled drive surface of said rotatable cylinder for positively driving said rotatable cylinder and the deflector means carried thereby, the axis of said drive wheel being disposed below the axis of said pivotal mounting when said drive wheel is in driving engagement with said drive surface whereby the weight of said motor maintains said drive wheel in tight frictional engagement with said rotatable cylinder.

2. Apparatus for continuously uniformly distributing silage or the like comprising a stationary cylinder, a plurality of circumferentially spaced bearing members mounted on said cylinder and extending outwardly from the periphery thereof, a rotatable cylinder concentric with and spaced outwardly from said stationary cylinder, said rotatable cylinder being formed with an annular groove for receiving said bearing members whereby said rotatable cylinder means is rotatably supported thereby, said rotatable cylinder having a top drive surface by which said rotatable cylinder can be driven, top resilient sealing means disposed between said stationary cylinder and said rotatable cylinder adjacent said top surface for preventing ingress of foreign matter into the area above said bearing members, bottom resilient sealing means disposed between said rotatable cylinder and said stationary cylinder below said bearing members for preventing ingress of foreign matter into the area below said bearing members, deflector means mounted on said rotatable cylinder means and extending downwardly therefrom, motor means pivotally mounted on said stationary cylinder, and a rotatable friction drive member driven by said motor means and directly engaging said top drive surface of said rotatable cylinder for positively driving said rotatable cylinder and the deflector means carried thereby.

3. The combination of claim 2 wherein said top resilient sealing means is mounted on said stationary cylinder and said bottom resilient sealing means is mounted for rotation with said rotatable cylinder.

4. The combination of claim 2 wherein the pivotal mounting of said drive means is above said top resilient sealing means and wherein said top sealing means is provided with an opening for receiving a motor drive shaft to which said friction drive member is mounted, said top sealing means enveloping said drive wheel and said top drive surface of said rotatable cylinder to preclude foreign matter from contacting the same.

5. Apparatus for continuously uniformly distributing silage or the like comprising a stationary cylinder, a plurality of circumferentially spaced bearing members mounted on said cylinder and extending outwardly from the periphery tthereof, a rotatable cylinder concentric with and spaced outwardly from said stationary cylinder, said rotatable cylinder being formed with an annular groove for receiving said bearing members whereby said rotatable cylinder means is rotatably supported thereby, said rotatable cylinder having a top, knurled drive surface by means of which said rotatable cylinder can be frictionally driven, top resilient sealing means mounted on said stationary cylinder and extending into contact with said rotatable cylinder for preventing ingress of foreign matter into the area above said bearing members, bottom resilient sealing means mounted for rotation with said rotatable cylinder and extending into contact with said stationary cylinder below said bearing members for preventing ingress of foreign matter into the area below said bearing members, deflector means mounted on said rotatable cylinder means and extending downwardly therefrom, motor means pivotally mounted on said stationary cylinder, and a rotatable friction drive wheel driven by said motor means and engaging said top knurled drive surface of said rotatable cylinder for positively driving said rotatable cylinder and the deflector means carried thereby, the axis of said drive wheel being disposed below the axis of said pivotal mounting when said drive wheel is in driving engagement with said drive surface whereby the weight of said motor maintains said drive wheel in tight frictional engagement with said rotatable cylinder.

6. The combination of claim 5 whereby said top resilient sealing means is mounted on said stationary cylinder, the pivotal mounting of said motor means is above said top resilient sealing means, and said top resilient sealing means is provided with an opening for receiving a motor drive shaft to which said drive wheel is mounted, said top resilient sealing means enveloping said drive wheel and said knurled drive surface of said rotatable cylinder to preclude foreign matter from contacting the same.

References Cited in the file of this patent

UNITED STATES PATENTS

| | | |
|---|---|---|
| 1,253,795 | Diehl | Jan. 15, 1918 |
| 1,508,093 | Erhardt | Sept. 9, 1924 |
| 1,775,803 | Baut | Sept. 16, 1930 |
| 2,449,592 | Daddario | Sept. 21, 1948 |
| 2,681,726 | Friedman et al. | June 22, 1954 |
| 2,690,827 | Wiggins | Oct. 5, 1954 |
| 2,808,295 | Caron | Oct. 1, 1957 |